May 18, 1954
G. R. DOUGLAS ET AL
2,678,564
ANGULAR VELOCITY SWITCH DEVICE
Filed Aug. 28, 1944
2 Sheets-Sheet 1
FIG. 1.
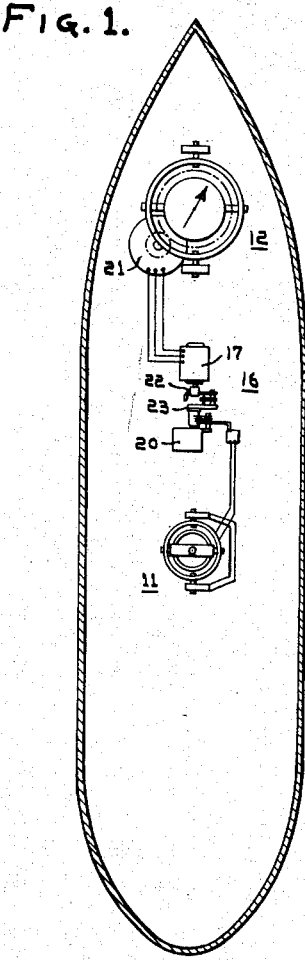
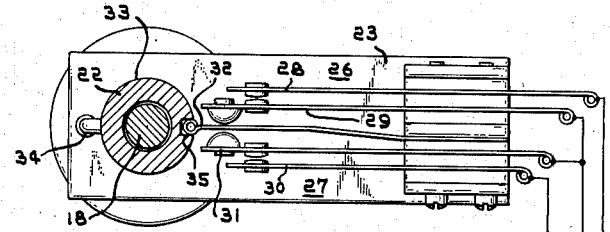
FIG. 3.
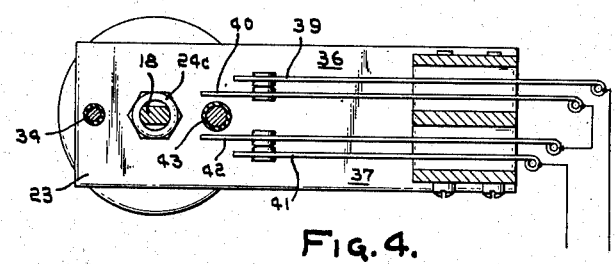
FIG. 4.
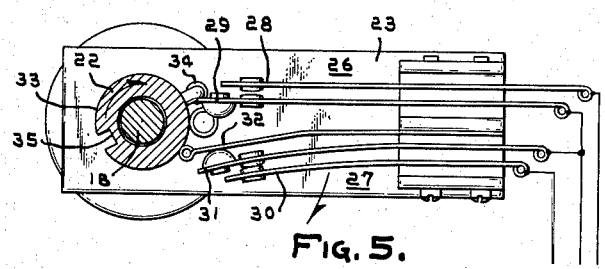
FIG. 5.
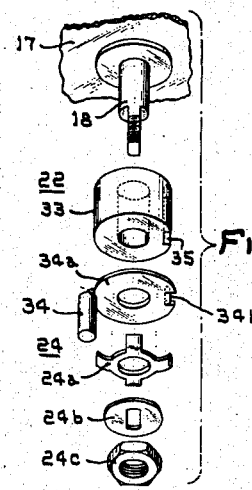
FIG. 7.
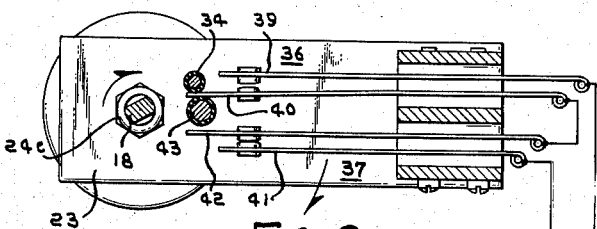
FIG. 6.
INVENTORS
GEORGE R. DOUGLAS
AND MERRIDETH D. WILSON.
BY
*a. B. R......*
ATTORNEY Patented May 18, 1954

2,678,564

UNITED STATES PATENT OFFICE 2,678,564

ANGULAR VELOCITY SWITCH DEVICE

George R. Douglas, Pittsburgh, and Merrideth D. Wilson, Turtle Creek, Pa., assignors to Westinghouse Electric Corporation, East Pittsburgh, Pa., a corporation of Pennsylvania Application August 28, 1944, Serial No. 551,572

7 Claims. (Cl. 74—5.41)

The invention relates to electric circuit interrupters and it has for an object to provide improved apparatus of this character which operates when the amplitude and velocity of turning of a suitable movable structure, such as a ship, exceed predetermined magnitudes.

In the stable element disclosed and claimed in the application of Hanna and Lynn, Serial No. 524,560, filed March 1, 1944, the positional accuracy of the gyroscope with respect to the vertical is improved by deenergization of the erecting magnet during the time that the position of the magnet with respect to the vertical is consistently and appreciably in error and due to the presence of forces other than that of gravity acting upon the mass of the pendulous magnet. An error of this kind is a common occurrence while changing the course or heading of the ship on which the stable element is mounted. During the time that the ship is making a turn, the pendulous erecting magnet is urged outwardly by centrifugal force. The position of the magnet is in error depending on the magnitude of the centrifugal force as compared with the pull of gravity; and, since the magnet does not hang truly vertical because of the applied centrifugal force, it would pull the gyro off vertical if it were not deenergized for the duration of the turn. The positional error of the magnet caused by turning of the ship is detrimental because it is a consistent error and exists for several minutes. Errors of a cyclic nature, such as caused by the yawing motion of a ship, are not harmful since the period is so short that the gyro does not have time to precess very far before the error reverses. Therefore, the problem is to design an interrupting device for the energizing circuit of the pendulous electromagnet that will recognize a rate of turn of the ship in excess of a given value and interrupt the circuit during the turn. The interrupting device must distinguish between a steady turn rate and a cyclic yaw; it must not respond to the latter, although the yaw may reach a maximum angular velocity many times the minimum rate at which response is desired; and, when a cyclic yaw is superimposed on a steady turn rate, the yaw must be filtered out so completely that intermittent operation of the interrupting device will not result. In said application, the magnet circuit is controlled by a separate gyro which operates to prevent interruption of the circuit unless the amplitude and velocity of turning both exceed predetermined minimum magnitudes. In accordance with the present invention, interruption of the magnet circuit is improved in that adverse effects due to roll and pitch as well as to cyclic yaws superimposed on steady turns are avoided.

The present type of cutout or circuit interrupter involves a synchro-motor, which rotates at an angular velocity proportional to that of turning of the ship, and a reversible rate motor operative at a constant low speed whose magnitude determines the minimum turning rate of the ship at which cutout or circuit interruption may occur. The rate motor is operated in an intermittent manner to follow the synchro-motor so long as the speed of the latter is less than that for continuous operation of the rate motor; however, just as soon as the synchro-motor rotates at a higher rate than the rate motor, it advances relative to the latter to bring about interruption of the magnet circuit. Thus, it is assured that the erector magnet cannot be deenergized unless the ship's turning rate exceeds a predetermined minimum. The angle through which the synchro-motor advances relative to the rate motor is so chosen as to avoid the cutout or interrupting operation in response to yaw.

If the minimum rate of turning of the ship of $\frac{1}{18}$ R. P. M. is selected, then, with a 36-speed synchro-motor connected to a 36-speed synchro-generator operated in response to angular movement of the ship relative to a compass, the synchro-motor would rotate at 2 R. P. M. Therefore, the rate motor would be arranged for rotation at 2 R. P. M. The rate motor follows the synchro-motor as long as the speed of the latter is less than 2 R. P. M., the energy to the rate motor being supplied intermittently for this purpose; however, just as soon as the synchro-motor rotates at a speed greater than 2 R. P. M., it advances in relation to the motor to bring about the interrupting operation. After the synchro-motor advances about 180 degrees relative to the rate motor, circuit interruption occurs, this advance or overtravel corresponding to a 5 degree turn of the ship whereby a cyclic yaw whose amplitude is less than 5 degrees can be accommodated without interrupting the energizing circuit. Therefore, under these conditions, before interruption could occur, the ship would have to turn at a rate greater than $\frac{1}{18}$ R. P. M. and through an angle of not less than 5 degrees.

If the magnet circuit were closed immediately following closing of opened contacts in the magnet circuit and which contacts are normally closed, then, with a yaw cycle superimposed on a steady turn, the contacts would be operated intermittently and would cause a large error because the magnet would be energized during a portion of the yaw cycle and this would be more serious than a steady turn since the angular velocity of yaw is relatively high. Therefore, with a first set of normally open contacts closed to energize the rate motor and with a second set of normally closed contacts opened by the synchro-motor when the latter has advanced a predetermined extent relative to the rate motor, the magnet circuit is immediately interrupted and remains interrupted as long as the rate of turning of the ship exceeds the predetermined minimum; however, upon closing of the second contacts, instead of the magnet being energized immediately, a time delay is introduced. With a time delay of twenty seconds, if, following closing of contacts and during the time delay period, another impulse causes the contacts to open, the time delay device is merely reset for another twenty second period following closing of the contacts. Thus with a delay selected which is longer than any yaw cycle period, it is assured that the magnet circuit will be maintained interrupted irrespective of cyclic yaw effects. While the delay should be longer than any yaw period, yet it should be short enough so that the delayed action in reenergizing the magnet after subsidence of a steady turn rate would not be objectionable. The time delay device, therefore, serves to filter out cyclic yaw effects so that yaw cycles superimposed on a steady turn will not result in the large errors referred to. Accordingly, a further object of the invention is to provide apparatus of the character referred to having the advantageous features of construction and operation pointed out.

Another object of the invention is to provide a synchro-motor which rotates at a rate proportional to the turning rate of a movable structure, such as a ship, a reversible rate motor operative at constant speed when energized and having the input of energy thereto controlled in response to differential motion of the motors, and an energizing circuit for a pendulous erector magnet and which circuit is opened in response to overtravel of the synchro-motor relative to the rate motor and is closed in response to lagging of the synchro-motor from its overtraveled position in relation to the rate motor.

A further object of the invention is to provide a control arrangement such as indicated in the immediately-preceding paragraph, with means to avoid yaw effects, such means comprising a time delay relay which does not interfere with prompt opening of the erector magnet energizing circuit and which provides a predetermined delay period after closing of the circuit before such circuit is effective to energize the erector magnet.

These and other objects are effected by the invention as will be apparent from the following description and claims taken in connection with the accompanying drawings, forming a part of this application, in which:

Fig. 1 is a diagrammatic view showing the system for controlling the energizing circuit of the erecting magnet;

Fig. 3 is a sectional detail view taken along the line III—III of Fig. 2;

Fig. 4 is a sectional view taken along the line IV—IV of Fig. 2;

Figs. 5 and 6 are views similar to Figs. 3 and 4 but showing parts in operated positions; and Fig. 7 is an exploded detail view of the friction slip clutch.

Figure 2:
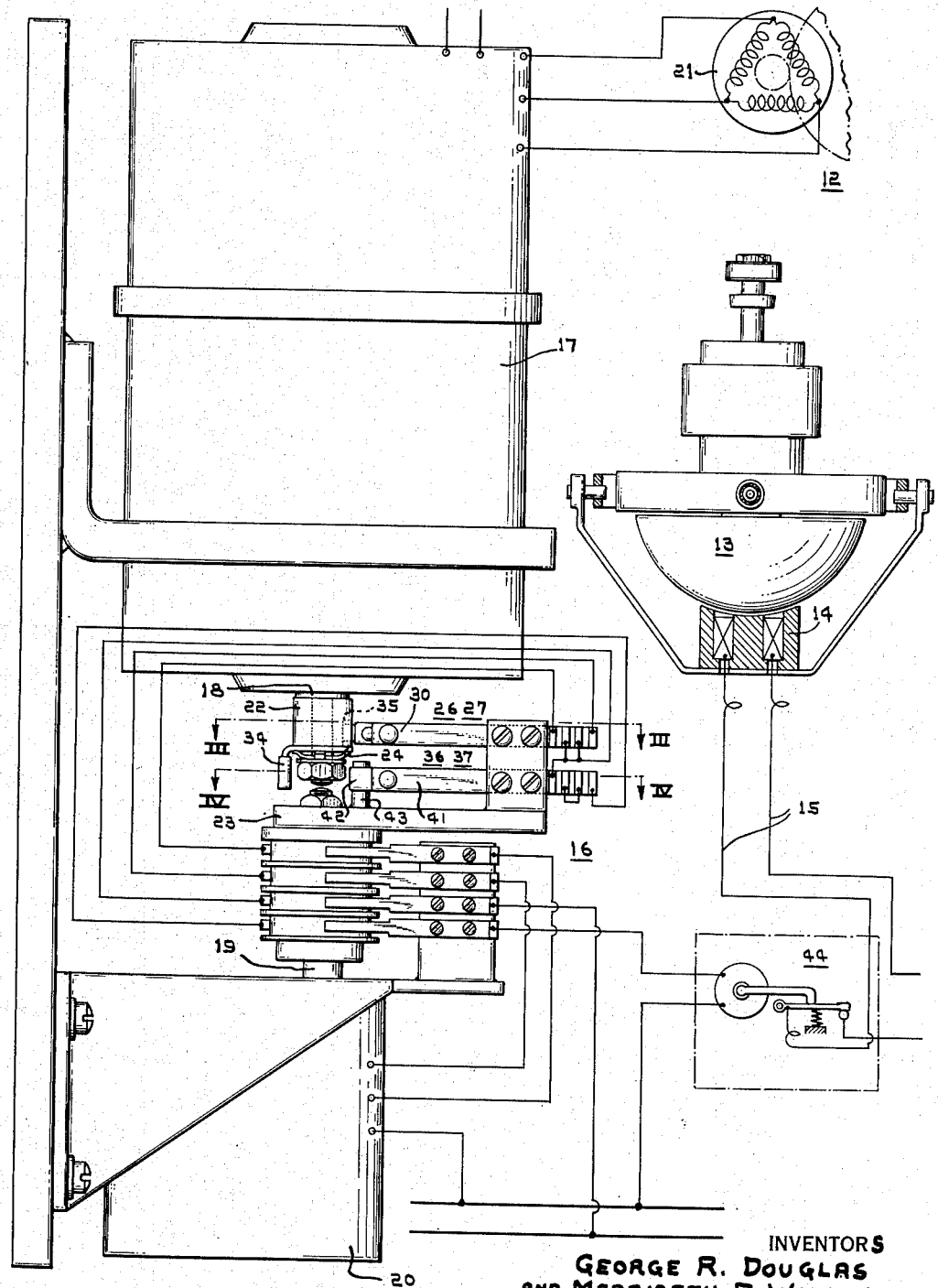
Fig. 2 is a view showing the main controlling apparatus in elevation and showing diagrammatically the means for actuating it and the means actuated thereby.

In the drawings, there is shown a ship 10 having a stable element, at 11, and a compass, at 12, mounted thereon.

As disclosed in the application aforesaid, the stable element, at 11, includes a pendulous electromagnet for exerting an erecting effect on the gyro. Fig. 2 shows fragmentarily such a gyro, at 13, with its erecting pendulous electromagnet 14. The magnet should be deenergized when the error introduced by centrifugal force is of sufficient magnitude, that is, at ship turning rates of about $\frac{1}{18}$ R. P. M. and greater and when the amplitude of turn exceeds a minimum of 5 degrees. By preventing operation until this minimum amplitude is exceeded, errors due to cyclic yaw are avoided. In the application, these purposes are achieved by means of a small gyro controlling the erecting magnet circuit. In accordance with the present invention, the erecting magnet circuit 15 is controlled by apparatus, at 16, which is unaffected by roll and pitch and which accommodates for cyclic yaw to better advantage.

The apparatus, at 16, includes a synchro-motor 17, whose rotor 18 is aligned with the shaft or member 19 driven by the reversible electric motor 20 by means of reduction gearing (not shown). The unitary arrangement of electric motor 20 and driven member 19 operated thereby functions as a rate motor for the reason that the speed of the member 19 depends upon the minimum turning rate at which it is desired that response shall begin. If the minimum ship turning rate is $\frac{1}{18}$ R. P. M., then the member 19 would rotate at 2 R. P. M.

The synchro-motor 17 is connected to the output circuit of a synchro-generator 21 operated in response to relative movement between the ship 10 and the meridian-seeking element of the compass 12. The synchro-generator 21 and the synchro-motor 17 are preferably both of the 36-speed type so that a 5 degree turn of the ship is equivalent to a turn of 180 degrees, both of the synchro-generator and of the synchro-motor.

The rotary elements 18 and 19 drive coupling members 22 and 23, respectively, the first coupling member 22 being connected to the rotor 18 by a friction clutch 24, for the purpose hereinafter pointed out, and the second coupling member being rigidly connected to the low speed shaft 19 for rotation with the latter.

The second coupling member 23 carries a first pair of contact sets, at 26, and, at 27, including, respectively, the normally open cooperating spring contacts 28 and 29 and cooperating spring contacts 30 and 31. An actuating spring arm 32 is also carried by the coupling member 23, it is arranged between the contacts 29 and 31, and it is operative to move either of the latter contacts to engage the contact 31 with the contact 30 or the contact 29 with the contact 28.

The coupling member 22 has a cam portion 33 and an abutment or pin portion 34, the cam portion having a slot, groove or depression 35 and the abutment or pin portion being spaced approximately 180 degrees therefrom.

As shown in Fig. 3, the outer end of the spring arm 32 normally fits in the cam groove 35. If the synchro-motor 17 starts to turn in one direction, the cam operates to move the actuating spring arm 32 to engage either the contact 29 or 31 with the contacts 28 and 30, respectively, to energize the motor 20 to rotate the member 19 in the same direction as the synchro-motor 17.

If the operated member 19 of the rate motor 20 tends to overtake the synchro-motor, the spring actuator 32 is thereby allowed to move back to open the contacts to deenergize the motor.

Thus, the rate motor is controlled so that its operated member 19 follows the synchro-motor, energy medium being intermittently supplied thereto so as to secure the follow-up operation so long as the rotational speed of the synchro-motor is less than the speed of the operated member. If the synchro-motor speed is equal to or greater than the energized rate motor operated member speed, energy medium is continuously supplied to the rate motor.

The rate motor coupling member 23 also carries a second pair of contact sets, at 36, and, at 37, arranged in the erector magnet circuit 15, and including, respectively, self-closing contacts 39 and 40 and self-closing contacts 41 and 42.

If the synchro-motor 17 operates at a speed greater than that of the rate motor operated member 19, the coupling member 22 overtravels relative to the coupling member 23, the outer end of the actuating spring arm 32 riding out of the cam groove 35 and keeping the operated set of self-opening contacts, at 26, or, at 27, closed. Upon the synchro-motor over-traveling the member 19 180 degrees, the abutment or pin 34 engages the contact 40 or the contact 42, depending upon the direction of rotation, to open the circuit 15, whereupon the erecting magnet is immediately deenergized.

After deflection of either of said contacts 40 or 42 to open the magnet circuit, further relative movement of the coupling members is prevented by the abutment element or pin 34 coming into abutment relation with respect to the abutment element or pin 43 carried by the coupling member 23. The friction clutch 24 slips to provide for relative movement of the synchro-motor and the rate motor incident to the elements being in abutment relation. Preferably, as shown in Fig. 7, the abutment 34 is carried by a washer 34a having a tongue 34b fitting the groove 35 and the clutch 24 comprises a cupped spring washer 24a which engages the washer 34a and the washer 24b having a noncircular fit with respect to a noncircular portion of the member 18. A nut 24c is adjustable on the lower end of the member 18 to vary the spring washer compression to vary the friction and, therefore, the torque at which slipping starts.

When the speed of the synchro-motor falls below that of the rate motor operated member, the coupling member 22 lags relative to the coupling member 23 to allow the opened contacts of the second pair of contact sets, at 36, or, at 37, to close and lagging continues until the groove 35 is positioned for the outer end of the spring arm 32 to enter thereinto, whereupon the parts are positioned for follow-up operation by the rate motor 20, in consequence of which, operation of the rate motor ceases upon turning of the ship coming to an end.

The circuit 15 also includes a time delay relay, at 44, of any suitable type, the relay operating to provide for prompt opening of the magnet circuit 15 upon opening of either of the sets of self-closing contacts, at 36, or, at 37, and being thereby set for time delay operation so that, after closing of the contacts so opened, a desired time interval may elapse before the circuit is closed for energization of the erecting magnet. The time delay should be longer than any probable yaw period and yet short enough after subsidence of a steady turn rate to avoid objection. For example, the time delay may be of the order of twenty seconds.

From the apparatus described, it will be apparent that, as long as the turn velocity or rate of the ship 10 is less than that of the rate motor operated member 19, the latter is operated intermittently to follow the synchro-motor and the erecting magnet remains energized. However, as soon as the speed of the synchro-motor is equal to or exceeds that of the rate motor operated member, the latter then rotates continuously at its rated speed; and, when the synchro-motor overtravels the rate motor operated member to engage the abutment element or pin 34 with one of the contacts 40 or 42 to move the latter to open one of the self-closing sets of contacts, at 36, and, at 37, the circuit 15 is thereby opened and the erecting magnet is immediately deenergized. The speed of the rate motor operated member, therefore, fixes the minimum turning rate effective to open the magnet circuit, for example, $\frac{1}{18}$ R. P. M. of the ship corresponding to 2 R. P. M. of the synchro-motor; and the overtravel required from the position at which the contacts of one of the self-opening sets, at 26, and, at 27, are closed to the position at which the contacts of the self-closing sets, at 36, and, at 37, are opened, determines the minimum angle of turning necessary to effect interruption of the magnet circuit, for example, a turn of 180 degrees corresponding to a 5 degree turn of the ship. Therefore, as interruption of the magnet circuit cannot occur unless the amplitude of turning of the ship is greater than 5 degrees, cyclic yaws up to that amplitude can be accommodated without deenergizing the magnet. The time delay device assures of a desired time interval after closing of the contact sets, at 36, and, at 37, before the circuit 15 is completed to energize the magnet and it constitutes the means by which the effects of cyclic yaw are filtered out on steady turns. As the yaw period is less than the delay, operation of the contacts because of cyclic yaw to produce impulses imposed on the time delay device successively resets the latter so that the magnet cannot be energized in response to yaw cycles superimposed on a steady turn.

While the invention has been shown in but one form, it will be obvious to those skilled in the art that it is not so limited, but is susceptible of various changes and modifications without departing from the spirit thereof.

What is claimed is:

1. In a stable element for use on a movable structure provided with a compass having a meridian-seeking element and the stable element including a neutral gyro and a pendulous electromagnetic erector acting on the latter to give to the spin axis thereof a vertical-seeking tendency, an energizing circuit for the erector and including contacts, a synchro-motor, means utilizing turning motion of the structure relative to the meridian-seeking element of the compass to control the synchro-motor so that the rotational speed of the latter is maintained proportional to the turning rate of the structure, a reversible rate motor provided with an operated rotary member and having a fixed rotational speed when energized, means responsive to a rotational differential of the synchro-motor and the rotary member to control the input of energy medium to the rate motor so that, when the synchro-motor leads the member, energy medium is supplied to the rate motor and when the member leads the synchro-motor the supply of energy medium to the rate motor is interrupted, whereby energy medium is intermittently supplied to the rate motor to cause the member to follow the synchro-motor when the latter rotates at speeds less than the speed of the member when driven by the energized rate motor and the energy medium is continuously supplied to the rate motor when the synchro-motor rotates at speeds equal to or greater than the speed of the member, and means responsive to overtravel of the synchro-motor relative to the rotary member to a predetermined extent to provide for opening of said contacts and to lagging of the synchro-motor from its overtraveled position relative to the rotary member to provide for closing of the opened contacts.

2. In a stable element for use on a movable structure subject to cycles of yaw motion and provided with a compass having a meridian-seeking element and the stable element including a neutral gyro and a pendulous electromagnetic erector acting on the latter to give to the spin axis thereof a vertical-seeking tendency, an energizing circuit for the erector and including contacts, a synchro-motor, means utilizing turning motion of the structure relative to the meridian-seeking element of the compass to control the synchro-motor so that the rotational speed of the latter is maintained proportional to the turning rate of the structure, a reversible rate motor provided with an operated member and having a fixed rotational speed when energized, means responsive to the rotational differential of the synchro-motor and the operated member to control the input of energy medium to the rate motor so that, when the synchro-motor leads the member, energy medium is supplied to the rate motor and, when the member leads the synchro-motor, the supply of energy medium to the rate motor is interrupted, whereby energy medium is intermittently supplied to the rate motor to cause the member to follow the synchro-motor for speeds of the latter which are less than the speed of the member when driven by the energized rate motor and the energy medium is continuously supplied to the rate motor when the synchro-motor rotates at speeds equal to or greater than the speed of the operated member of the energized rate motor, means responsive to overtravel of the synchro-motor relative to the member to a predetermined extent to provide for opening of said contacts and to lagging of the synchro-motor from its overtraveled position relative to the member to provide for closing of the opened contacts, and a time delay device in said energizing circuit and operative to render the latter effective a predetermined time interval after said opened contacts are closed.

3. In a stable element for use on a movable structure subject to cycles of yaw motion and provided with a compass having a meridian-seeking element and the stable element including a neutral gyro and a pendulous electromagnetic erector acting on the latter to give to the spin axis thereof a vertical-seeking tendency, an energizing circuit for the erector; a synchro-motor; means utilizing turning motion of the structure relative to the meridian-seeking element of the compass to control the synchro-motor so that the rotational speed of the latter is maintained proportional to the turning rate of the structure; a reversible rate motor having a driven shaft rotatable at a fixed speed when the motor is energized; an energizing circuit for the rate motor; a coupling including first and second members; friction clutch means connecting the first member to the synchro-motor; means for connecting the second member to the rate motor shaft for rotation therewith; a pair of sets of self-opening contacts for the rate motor energizing circuit and carried by the second member; one set of said contacts being arranged, when closed, to energize the rate motor for rotation in one direction and the other set of said contacts being arranged, when closed, to energize such motor for rotation in the other direction; means carried by the first member and cooperating with said contacts so that the latter are operated in response to a rotational differential of the members such that, when the first member leads the second member, energy medium is supplied to the rate motor and, when the first member lags with respect to the second member, the supply of energy medium to the rate motor is interrupted, whereby energy medium is intermittently supplied to the rate motor to cause the shaft of the latter to follow the synchro-motor when the latter rotates at speeds less than that of the shaft of the energized rate motor and the energy medium is continuously supplied to the rate motor when the synchro-motor rotates at speeds equal to or greater than the speed of the energized rate motor shaft; first and second abutment elements carried by the first and second coupling members and arranged to come into abutting relation to limit overtravel of the first member relative to the second member; self-closing contacts arranged in said erector energizing circuit, carried by the second member, and engageable by the first abutment element to open as such element approaches the end of its overtravel and disengageable from said element so as to close as the first member lags from its overtraveled position relative to the second member; and a time delay relay in said erector energizing circuit and operative to interpose a predetermined time delay following closing of the self-closing contacts before the energizing circuit is effective to energize the magnet.

4. In combination, an energizing circuit; a reversible rate motor having a driven shaft operable at a constant speed when the motor is energized; a controlling motor having a rotor operable in opposite directions; means responsive to a rotational differential of the rotor and the shaft to control the input of energy medium to the rate motor such that, when the controlling motor rotor leads the rate motor shaft, energy medium is supplied to the rate motor and, when it lags relative to the rate motor shaft, the supply of energy medium to the rate motor is interrupted, whereby energy medium is intermittently supplied to the rate motor for speeds of the controlling motor rotor less than the energized rate motor shaft speed in order that the rate motor shaft may follow the controlling motor rotor and the energy medium is continuously supplied to the rate motor for speeds of the controlling motor rotor equal to and greater than the energized rate motor shaft speed; self-closing contacts for said energizing circuit; and means operative in response to overtravel of the controlling motor rotor relative to the energized rate motor shaft and rotating in the same direction for opening said self-closing contacts and operative in response to lagging of the controlling motor rotor relative to the rate motor shaft to provide for closing of such contacts.

5. In combination, an energizing circuit; a reversible rate motor having a shaft operable at constant speed when the motor is energized; a controlling motor rotor operable in opposite directions; means responsive to a rotational differential of the rotor and shaft to control the input of energy medium to the rate motor such that, when the controlling motor rotor leads the rate motor shaft, energy medium is supplied to the rate motor and, when it lags relative to the rate motor shaft, the supply of energy medium to the rate motor is interrupted, whereby energy medium is intermittently supplied to the rate motor for speeds of the controlling motor rotor less than the energized rate motor shaft speed in order that the rate motor shaft may follow the controlling motor rotor and the energy medium is continuously supplied to the rate motor for speeds of the controlling motor rotor equal to and greater than the energized rate motor shaft speed; self-closing contacts in said energizing circuit; means operative in response to overtravel of the controlling motor rotor relative to the shaft of the energized rate motor rotating in the same direction for opening said self-closing contacts and operative in response to lagging of the controlling motor rotor relative to the rate motor shaft to provide for closing of such contacts; and a time delay relay arranged in the energizing circuit and operative to introduce a time delay before the energizing circuit becomes effective following closing of the opened self-closing contacts thereof.

6. In combination, an energizing circuit; a reversible rate motor having a shaft operable at constant speed when the motor is energized; a controlling motor having a rotor operable in opposite directions; a coupling including first and second members; friction clutch means connecting the first member to the controlling motor rotor and providing for slippage when a predetermined torque is exceeded; means for connecting the second member to the rate motor shaft for rotation therewith; self-closing contacts carried by the second member and arranged for closing operation in response to movement of the first member in opposite directions relative to the second member to energize the rate motor to cause the second member to follow the first member; first and second abutment elements carried by the first and second coupling members and arranged to come into abutting relation to limit overtravel of the first member relative to the second member; and self-closing contacts in said energizing circuit, carried by the second member, and arranged for operation by said first element to open the energizing circuit as the limit of said overtravel is approached.

7. In combination, an energizing circuit; a reversible rate motor having a shaft operable at constant speed when the motor is energized; a controlling motor having a rotor operable in opposite directions; a coupling including first and second members; friction clutch means connecting the first member to the controlling motor rotor; means for connecting the second member to the rate motor shaft for rotation therewith; self-opening contacts carried by the second member and arranged for closing operation in response to movement of the first member in opposite directions relative to the second member to energize the rate motor to cause the second member to follow the first member; first and second abutment elements carried by the first and second coupling members and arranged to come into abutting relation to limit overtravel of the first member relative to the second member; self-closing contacts in said energizing circuit, carried by the second member, and arranged for operation by the first element to open the energizing circuit as the end of overtravel of the first member is approached; and a time delay relay operative to prevent completion of the energizing circuit a predetermined time interval following closing of said self-closing contacts.

References Cited in the file of this patent

UNITED STATES PATENTS

| Number | Name | Date |
|---|---|---|
| 1,934,774 | Sperry et al. | Nov. 14, 1933 |
| 2,188,606 | Koster | Jan. 30, 1940 |
| 2,293,039 | Esval | Aug. 18, 1942 |
| 2,369,131 | Braddon et al. | Feb. 13, 1945 |